US012626878B2

(12) United States Patent
Rodriguez et al.

(10) Patent No.: US 12,626,878 B2
(45) Date of Patent: May 12, 2026

(54) REVERSE HANDLE ACCESSORY FOR MOLDED CIRCUIT BREAKER

(71) Applicant: Siemens Industry, Inc., Alpharetta, GA (US)

(72) Inventors: Mauricio Rodriguez, Duluth, GA (US); Mario Munoz, Buford, GA (US); Lawrence Navarre, Norcross, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 202 days.

(21) Appl. No.: 18/455,170

(22) Filed: Aug. 24, 2023

(65) Prior Publication Data

US 2025/0069839 A1 Feb. 27, 2025

(51) Int. Cl.
*H01H 71/52* (2006.01)
*H01H 71/02* (2006.01)

(52) U.S. Cl.
CPC ...... *H01H 71/521* (2013.01); *H01H 71/0264* (2013.01)

(58) Field of Classification Search
CPC ........... H01H 2009/02; H01H 2009/20; H01H 2013/05; H01H 2050/02; H01H 2203/04; H01H 2221/00; H01H 2221/016; H01H 2221/024; H01H 3/04; H01H 3/06; H01H 9/02; H01H 9/20; H01H 9/22; H01H 9/24; H01H 71/00; H01H 71/02; H01H 71/0207; H01H 71/025; H01H 71/50; H01H 71/52; H01H 71/521; H01H 71/522; H01H 71/526; H01H 73/00; H01H 73/02; H01H 73/04; H01H 73/06; H01H 73/24; H01H 2003/00; H01H 2003/007; H01H 2003/028
USPC .................................................. 200/237, 335
See application file for complete search history.

(56) References Cited

U.S. PATENT DOCUMENTS 6,194,983 B1 * 2/2001 Bogdon .................. G05G 1/04 335/73
6,797,903 B1 * 9/2004 Winslett ............... H01H 71/501 200/330

* cited by examiner

*Primary Examiner* — Anthony R Jimenez

(57) ABSTRACT

A circuit breaker accessory for reverse handle operation of a circuit breaker installed in a vertically inverse orientation includes a housing configured for attachment to a face of a circuit breaker on which a switching handle of the circuit breaker is arranged. A reverse switching handle is configured with a transverse sleeve for a pivot axis of operation between a down position and an up position with a top to protrude through the housing. An extension arm has a pivoting connector at a first end for coupling with the bottom end of the reverse switching handle, and a collar at a second end for coupling with the switching handle of the circuit breaker. A pivot shaft couples the transverse sleeve of reverse switching handle with the housing, arranged to fit through the transverse sleeve. The reverse switching handle operates in a direction opposite to the switching handle of the circuit breaker due to extension by the extension arm.

8 Claims, 3 Drawing Sheets

REVERSE HANDLE ACCESSORY FOR MOLDED CIRCUIT BREAKER

TECHNICAL FIELD

This application relates to circuit breakers. More particularly, this application relates to an accessory for a molded case circuit breaker for inverted installation.

BACKGROUND

The National Electric Code requires circuit breaker operation conformity such that for a circuit breaker switching handle operated vertically, the up position shall be the "on" position (circuit breaker closed). However, there are certain installations that require that the circuit breaker be arranged in a panel such that the vertical orientation is inverted, which results in a reversal of switching handle direction when operated vertically, adverse to the code requirement.

An example of such an installation is illustrated in FIG. 1, in which pairs of a molded case circuit breaker 101 with switching handle 105 are to be installed in an electrical enclosure 110 (e.g., a load center with a bank of watt-hour meters). This configuration can be found in new construction and modifications to multi-unit dwellings that now specify a mandatory provision for electrical vehicle (EV) charging for each service line. In order to accommodate this new requirement, a separate circuit is to be protected by a dedicated circuit breaker. A first circuit breaker 101*a* is mounted to a bus bar (not shown) in enclosure 110, oriented in the usual manner such that switching handle 105 is in the up position for an energized circuit load (i.e., circuit breaker closed, "on" position). For this example, circuit breaker 101*a* is a main circuit breaker for a metered electricity supply service, with meter connection point 120 shown in an adjacent compartment. A second circuit breaker 101*b* dedicated for the EV charging service is also mounted to the same bus bar, but inverted (upside-down) to permit wiring connections 102 without interference. For convenient metering, it is desirable to install the second circuit breaker 101*b* for the EV charger circuit adjacent to the main circuit breaker 101*a*. Due to the wiring access, bus configuration and space limitations, a preferred installation of circuit breaker 101*b* is in an inverted configuration, abutting circuit breaker 101*a* as shown. This way, both circuit breakers 101*a*, 101*b* can be connected on the same bus bar stabs to avoid potential overheating of the distribution bus bar. In such cases, the circuit breaker 101*b* violates the above stated code requirement for direction of the switching handle position. There is a need to reverse the switching handle operation for a circuit breaker for vertically inverted (upside-down) installations in order to comply with code requirements.

SUMMARY

Aspects of the present disclosure provide an apparatus for reversing the switching handle direction of a circuit breaker installed in a vertically inverted configuration, without having to deconstruct the molded case circuit breaker and avoiding a redesign and manufacture of a specialized circuit breaker with reversed switching handle. The technical solution provides an assembly that can be easily attached to the face of the circuit breaker which couples an operable extension to the switching handle to reverse the switching handle direction.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Figure 1B:
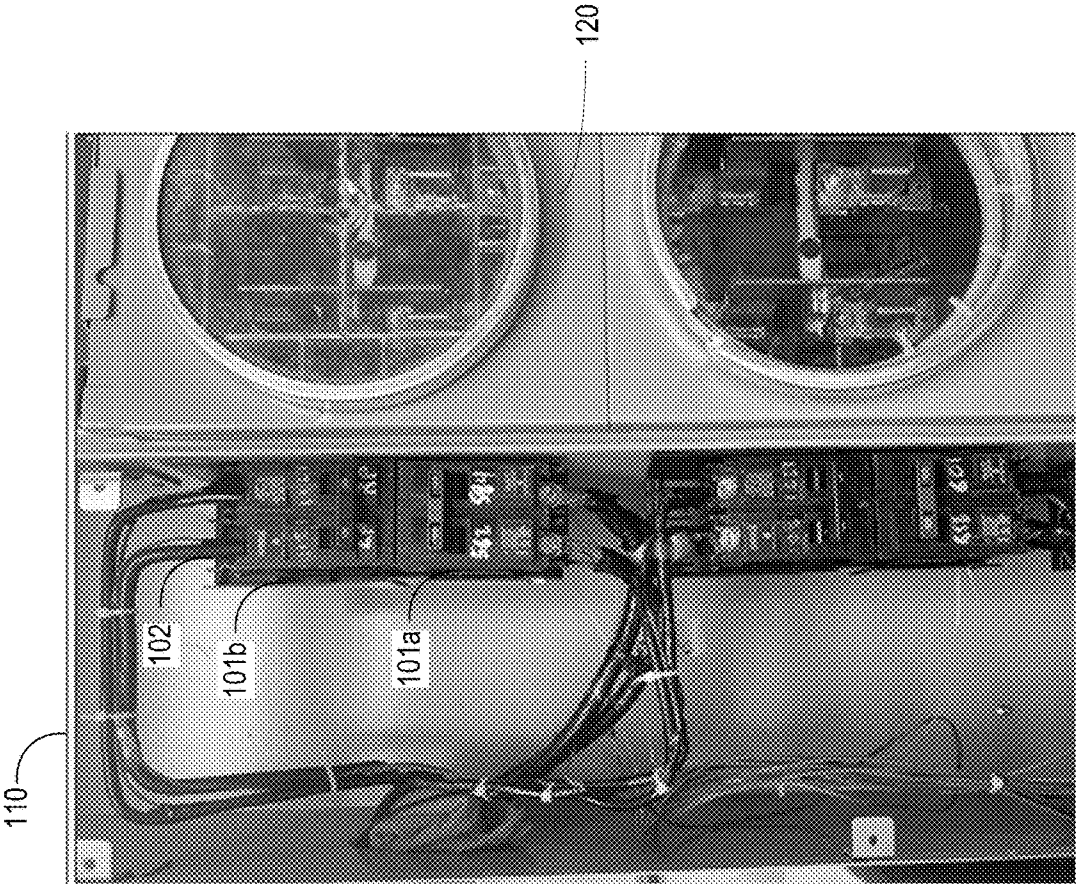
FIGS. 1A and 1B illustrate an example of electrical panel compartment installation with stacked pairs of circuit breakers in a power meter bank.
Figure 1A:
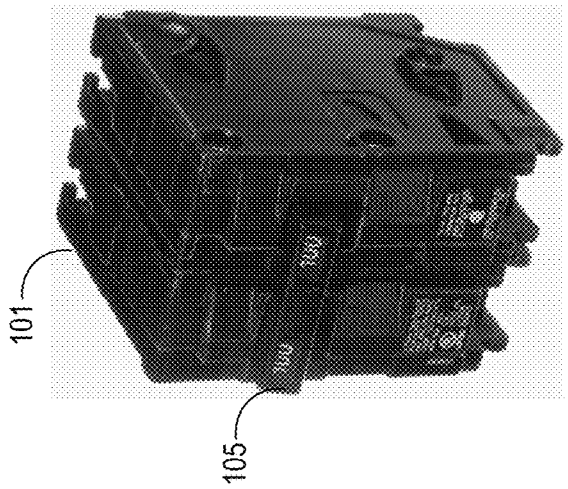
Figure 2B:
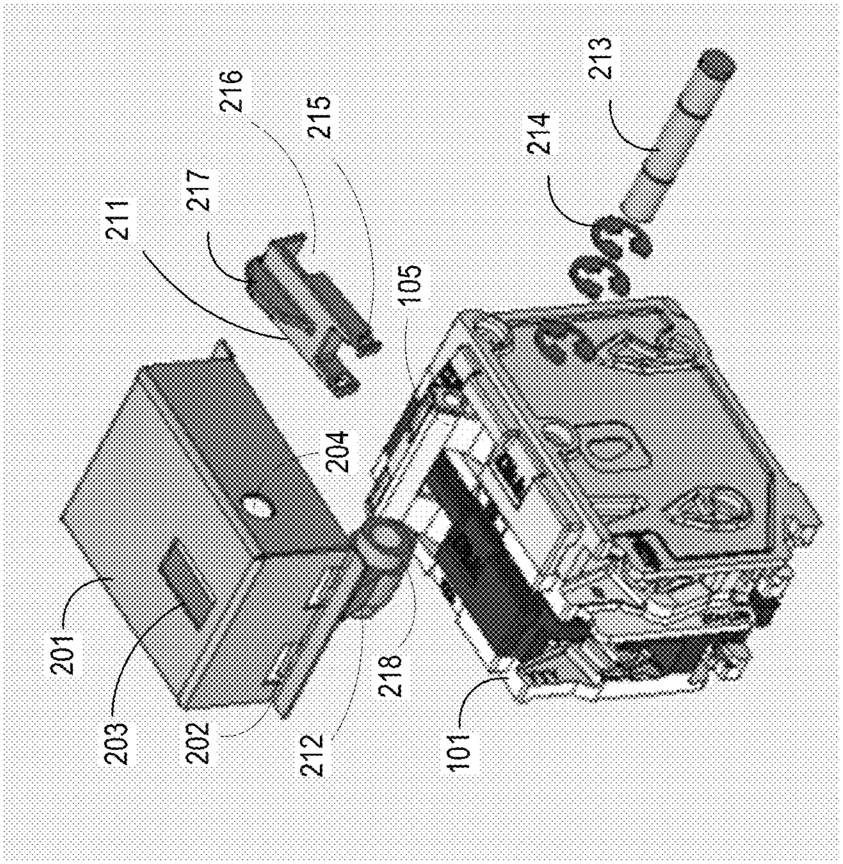
FIGS. 2A, 2B illustrate an example of a circuit breaker accessory with inverted switching handle in accordance with embodiments of this disclosure.
Figure 2A:
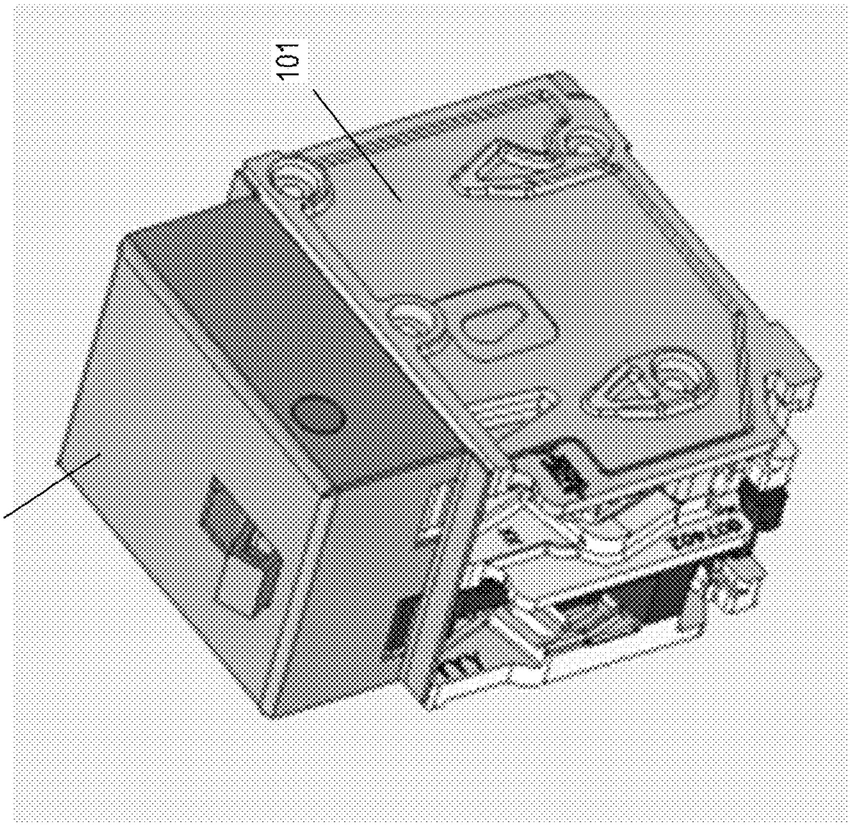

FIGS. 2A, 2B illustrate an example of a circuit breaker accessory with reverse switching handle in accordance with embodiments of this disclosure. As shown in FIG. 2A, an accessory 200 is provided for easily attaching to circuit breaker 101. Details of accessory 200 is shown as an exploded view in FIG. 2B. A housing 201 includes a handle opening 203 for allowing reverse switching handle 212 to protrude and operate freely for a range of motion between up and down positions. Mounting features 202 can be arranged along any edge of housing 201 for enabling a snap-on or clip-in fit to a coupling point of circuit breaker 101. For example, a protruding tab on circuit breaker 101 can snap into a mounting feature 202 configured as a fitted slot that mates with the tab. As an alternative, the slot and tab may be opposite of this. Other attachment means may include set screws, pins, rivets, clips, or the like.

The reversing handle 212 is connected to the switching handle 105 via extension arm 211 within the interior of housing 201. A pivoting connector 215 is configured on extension arm 211 for connection to the bottom end of switching handle 212. In an embodiment, pivoting connector 215 is implemented as a pair of connection tabs that snap fit onto indentations at the mating end of reverse switching handle 212. Other means for the pivot connection may include a pin connection or other suitable substitution. Collar 216 is a coupling feature on extension arm 211 for coupling with switching handle 105. In an embodiment, collar 216 has diameter that is slightly larger than the width of switching handle 105 for a fit that permits free rotation within the diameter while remaining coupled. Flange feature 217 is arranged along the top surface of extension arm 211 as a constant contact point with the inside of housing 201, for keeping collar 216 coupled with switching handle 105. Flange feature 217 may be shaped to allow rolling along its edge against housing 201 as switching handle 105 is operated up and down via reverse switching handle operation. To couple reverse switching handle 212 to the housing 201, pivot shaft 213 fits into a pair of pivot openings 204 of housing 201 and is arranged to fit within transverse sleeve 218 of reverse switching handle 212. Collar pins 214 may be used to hold transverse sleeve 218 in place on pivot shaft 213 and may also secure pivot shaft 213 within housing 201 without restricting rotation of transverse sleeve 218.

Figure 3:
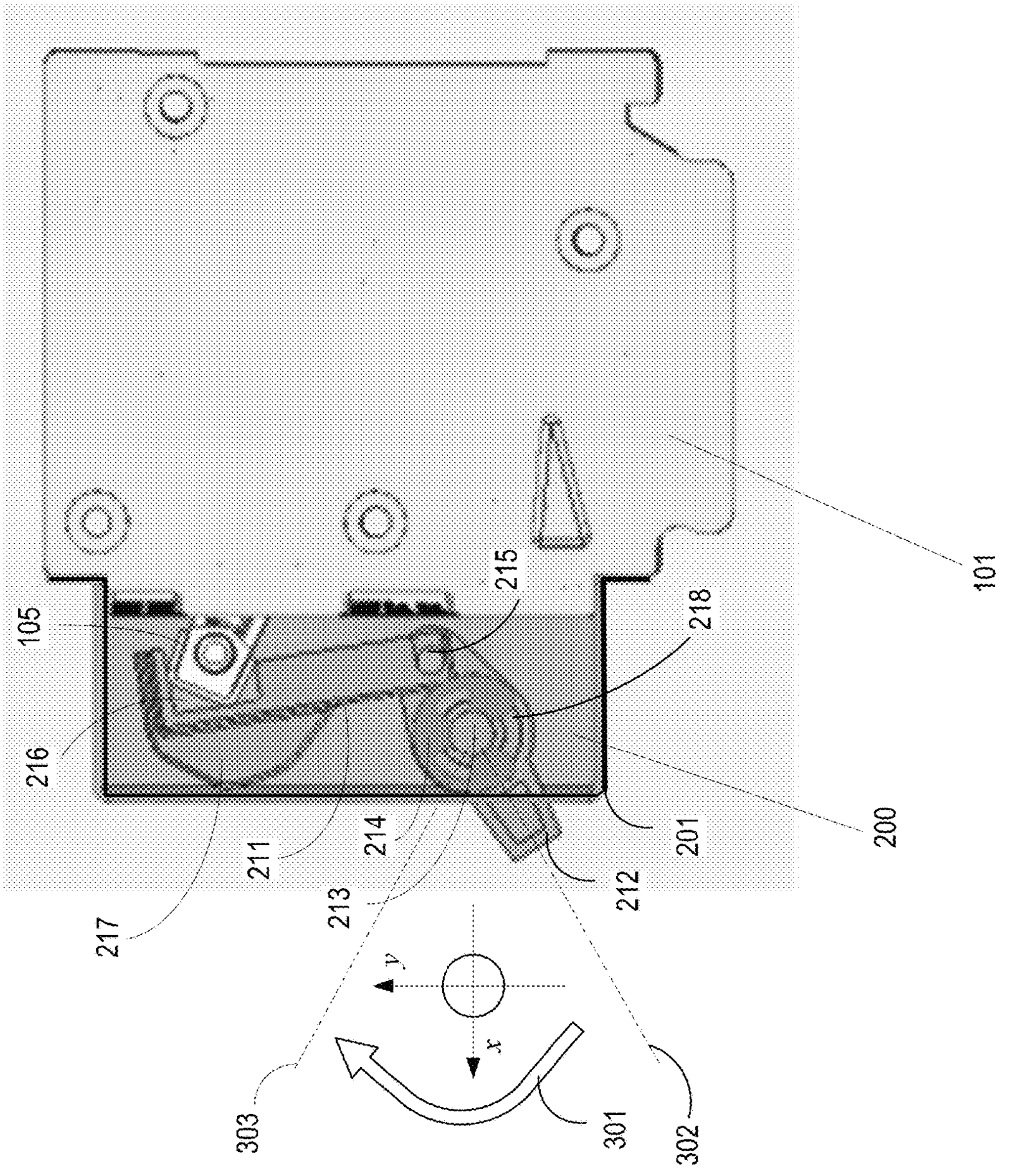
FIG. 3 illustrates an example of a side cross-sectional view for the inverted switching handle installed on a circuit breaker in accordance with embodiments of this disclosure.

FIG. 3 illustrates an example of a side cross-sectional view for the inverted switching handle installed on a circuit breaker in accordance with embodiments of this disclosure. Here, the assembly 200 is shown in the attached configuration on the face of circuit breaker 101 and engaged with switching handle 105. Extension arm 211 is coupled at one end to switching handle 105 via collar 216. Flange 217 is shown in contact with housing 201, keeping collar 216 engaged with switching handle 105. At the other end of extension arm 211, pivot connector 215 is coupled to the bottom end of reverse switching handle 212. The pivoting action on reverse switching handle 212 centers on the axis formed by pivot shaft 213 within transverse sleeve 218. One or more collar pins 214 may be used to secure. The length of extension arm 211 is set to correspond with the top end of reverse switching handle 212 being in the down position while the position of the switching handle 105 is in the up position and vice-versa. The axial center point of pivot shaft 213 and corresponding center point of pivot opening 204 along the x dimension of housing 201 is determined in conjunction with the length of reverse switching handle 212, such as to allow for adequate clearance between the face of circuit breaker 101 and the bottom end of reverse switching handle 212. The axial center point of pivot shaft 213 and corresponding center point for pivot openings 204 along the y dimension of housing 201 is determined in conjunction with the length of reverse switching handle 212, such as to allow for a desired angular range of operation 301 between the down position 302 and the up position 303. Operation of reverse switching handle 212 from the down position to the up position draws extension arm 211 downward, pulling switching handle 105 downward, thus reversing its position with respect to handle 212. Conversely, operation of reverse switching handle 212 from the up position to the down position drives extension arm 211 upward, which moves switching handle 105 upward to the up position, thus reversing its position with respect to handle 212.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A circuit breaker accessory for reverse handle operation of a circuit breaker installed in a vertically inverse orientation, the accessory, comprising:

a housing configured for attachment to a face of a circuit breaker on which a switching handle of the circuit breaker is arranged, the housing comprising a handle opening on the face surface and a pair of pivot openings to accept a pivot shaft through two sides of the housing;

a reverse switching handle configured with a transverse sleeve for a pivot axis of operation between a down position and an up position, a top end arranged to protrude through a first opening, and a bottom end;

an extension arm configured with a pivoting connector at a first end for coupling with the bottom end of the reverse switching handle, and a collar at a second end for coupling with the switching handle of the circuit breaker; and the pivot shaft, wherein the pivot shaft is:

configured to couple the transverse sleeve of the reverse switching handle with the housing, and arranged to fit through the pair of pivot openings and through the transverse sleeve;

wherein the reverse switching handle operates in a direction opposite to the switching handle of the circuit breaker due to extension by the extension arm.

2. The circuit breaker accessory of claim 1, wherein the pivoting connector is implemented as a pair of connection tabs that snap fit onto indentations at the bottom end of the reverse switching handle.

3. The circuit breaker accessory of claim 1, wherein the collar has a diameter that is slightly larger than the width of the switching handle for a fit that permits free rotation within the diameter while maintaining a coupling.

4. The circuit breaker accessory of claim 1, wherein a length of the extension arm is set to correspond with the top end of the reverse switching handle being in the down position while the position of the switching handle of the circuit breaker is in the up position and vice-versa.

5. The circuit breaker accessory of claim 1, wherein an axial center point of the pivot shaft and corresponding center point of the pivot openings along a first dimension of the housing is determined in conjunction with a length of the reverse switching handle, such as to allow for clearance between the face of the circuit breaker and the bottom end of the reverse switching handle.

6. The circuit breaker accessory of claim 1, wherein an axial center point of the pivot shaft and corresponding center point of the pivot openings along a second dimension of the housing is determined in conjunction with a length of the reverse switching handle, such as to allow for a full angular range of operation between the down position and the up position of the reverse switching handle.

7. The circuit breaker accessory of claim 1, wherein the extension arm comprises a flange arranged along a top surface of the extension arm for constant contact with an inside surface of the housing which forces the collar against the switching handle of the circuit breaker to maintain the coupling with the switching handle of the circuit breaker.

8. The circuit breaker accessory of claim 7, wherein the flange is shaped to allow rolling along its edge against the inside surface of the housing as the switching handle is operated up and down.

* * * * *